United States Patent
Suarato

(10) Patent No.: US 10,974,832 B2
(45) Date of Patent: Apr. 13, 2021

(54) SYSTEM FOR THE EMERGENCY OXYGEN SUPPLY OF PASSENGERS IN AN AIRCRAFT

(71) Applicant: B/E Aerospace Systems GmbH, Lubeck (DE)

(72) Inventor: Gianpiero Suarato, Lubeck (DE)

(73) Assignee: B/E Aerospace Systems GmbH

( * ) Notice: Subject to any disclaimer, the term of this patent is extended or adjusted under 35 U.S.C. 154(b) by 405 days.

(21) Appl. No.: 15/936,172

(22) Filed: Mar. 26, 2018

(65) Prior Publication Data
US 2018/0273179 A1 Sep. 27, 2018

(30) Foreign Application Priority Data

Mar. 27, 2017 (DE) .......................... 102017205125.6

(51) Int. Cl.
*B64D 11/00* (2006.01)
*A62B 7/14* (2006.01)

(52) U.S. Cl.
CPC ........ *B64D 11/00* (2013.01); *B64D 2231/025* (2013.01)

(58) Field of Classification Search
CPC .......... A61M 16/06; A61M 2202/0208; A62B 18/02; A62B 18/025; A62B 18/10; A62B 21/00; A62B 25/00; A62B 25/005; A62B 27/00; A62B 7/02; A62B 7/04; A62B 7/08; A62B 7/10; A62B 7/12; A62B 7/14; A62B 9/00; A62B 9/006; A62B 9/02; A62B 9/04; B64D 10/00; B64D 11/00; B64D 11/003; B64D 11/0629; B64D 11/0632; B64D 13/00; B64D 13/02; B64D 2013/0677;
(Continued)

(56) References Cited

U.S. PATENT DOCUMENTS 4,154,237 A * 5/1979 Courter .................. B64D 11/00
128/202.13
6,497,386 B2 12/2002 Martinez
(Continued)

FOREIGN PATENT DOCUMENTS

DE 102013220478 A1 4/2015

OTHER PUBLICATIONS

Office Action on German Patent Application No. 102017205125.6 dated Dec. 4, 2017. 5 pages.

*Primary Examiner* — Annette Dixon
(74) *Attorney, Agent, or Firm* — Locke Lord LLP; Scott D. Wofsy; Joshua L. Jones

(57) ABSTRACT

A system for the emergency oxygen supply of passengers in an aircraft includes at least one primary oxygen mask and at least one secondary oxygen mask arranged in the aircraft in a compartment above a seat, and a retaining receptacle arranged in the compartment. The at least one primary oxygen mask and at least one secondary oxygen mask are each connected to an oxygen source by way of a tube. The at least one primary oxygen mask drops out of the compartment before the at least one secondary oxygen mask when a flap of the compartment opens. The at least one secondary oxygen mask is arranged in the at least one retaining receptacle. The retaining receptacle is connected to the compartment by a first connector and to an activation device of the oxygen source by a second connector. The at least one primary oxygen mask can activate the oxygen source.

15 Claims, 2 Drawing Sheets

(58) Field of Classification Search
CPC ............ B64D 2231/00; B64D 2231/02; B64D 2231/025; B64D 25/00; B64D 47/00; B65D 43/26; E05B 51/02; G01F 1/28; G01P 13/0006; G01R 31/008; H04L 12/185; H04L 12/4645; H04L 41/00; H04L 41/0893; H04L 43/0811; H04L 45/00; H04L 45/10; H04L 45/50; Y02T 50/44; Y02T 50/46; Y02T 50/56; Y10S 292/11; Y10S 292/65; Y10T 137/6906; Y10T 29/49769; Y10T 29/49826; Y10T 292/081; Y10T 292/0826

See application file for complete search history.

(56) References Cited

U.S. PATENT DOCUMENTS 7,431,034 B2 * 10/2008 Westphal ............... B64D 13/00
128/204.18
7,621,275 B2 * 11/2009 Fischer ............... A62B 25/005
128/204.29

* cited by examiner

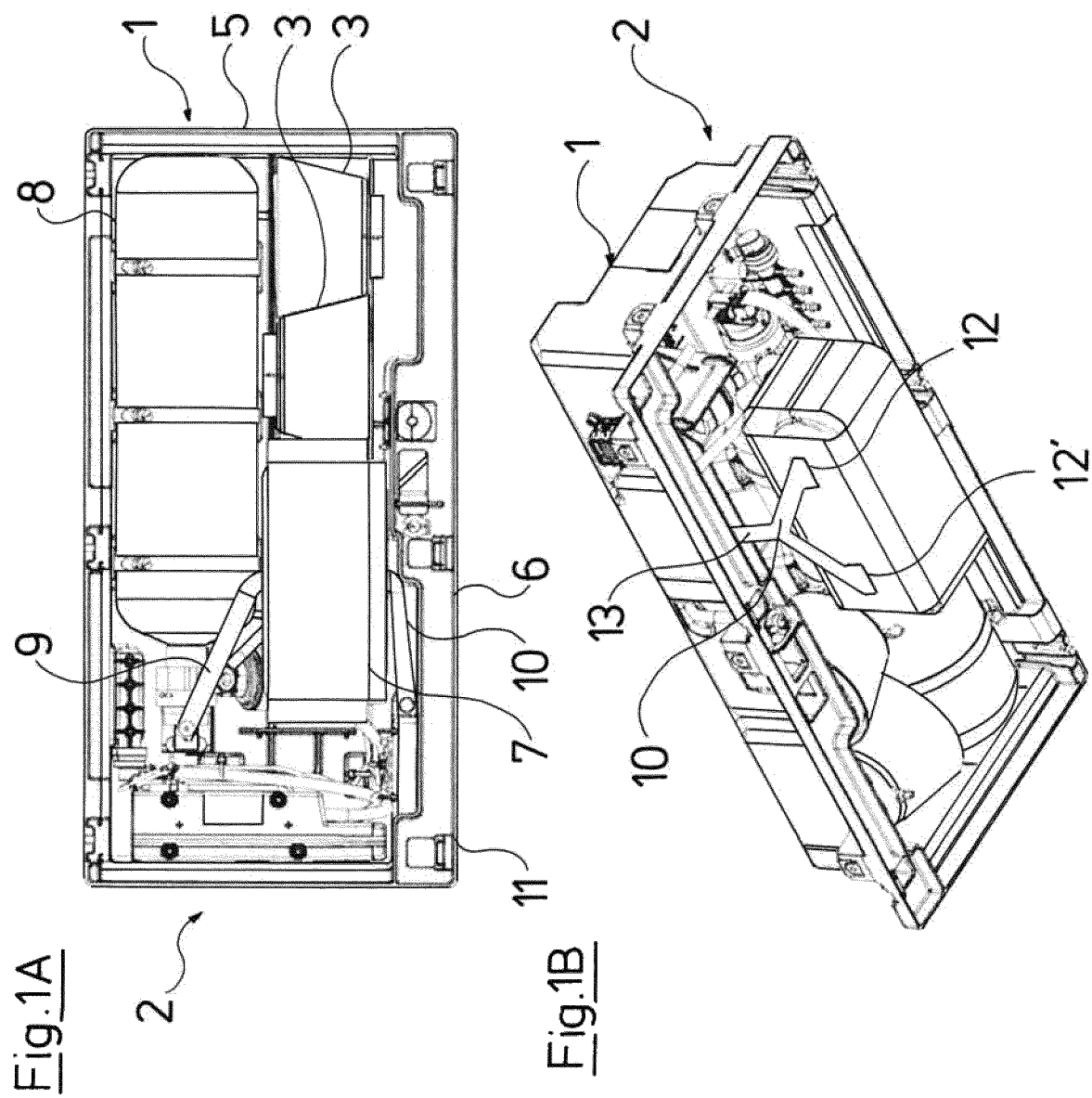

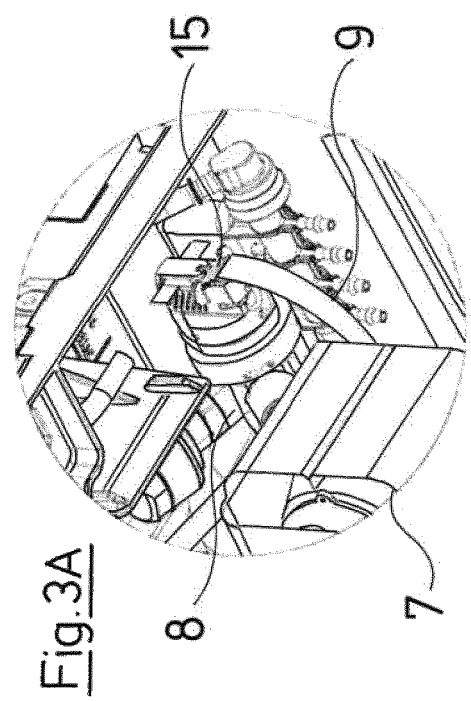
Fig.3A
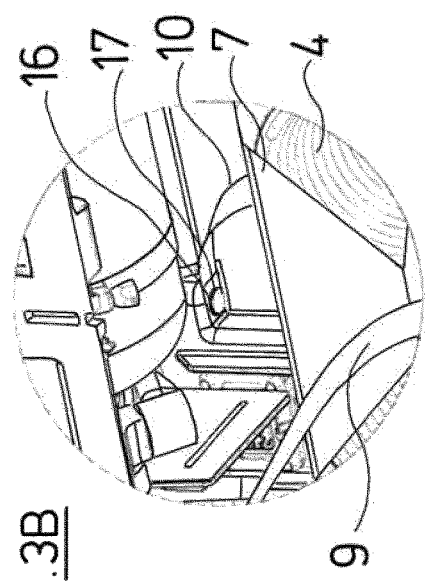
Fig.3B
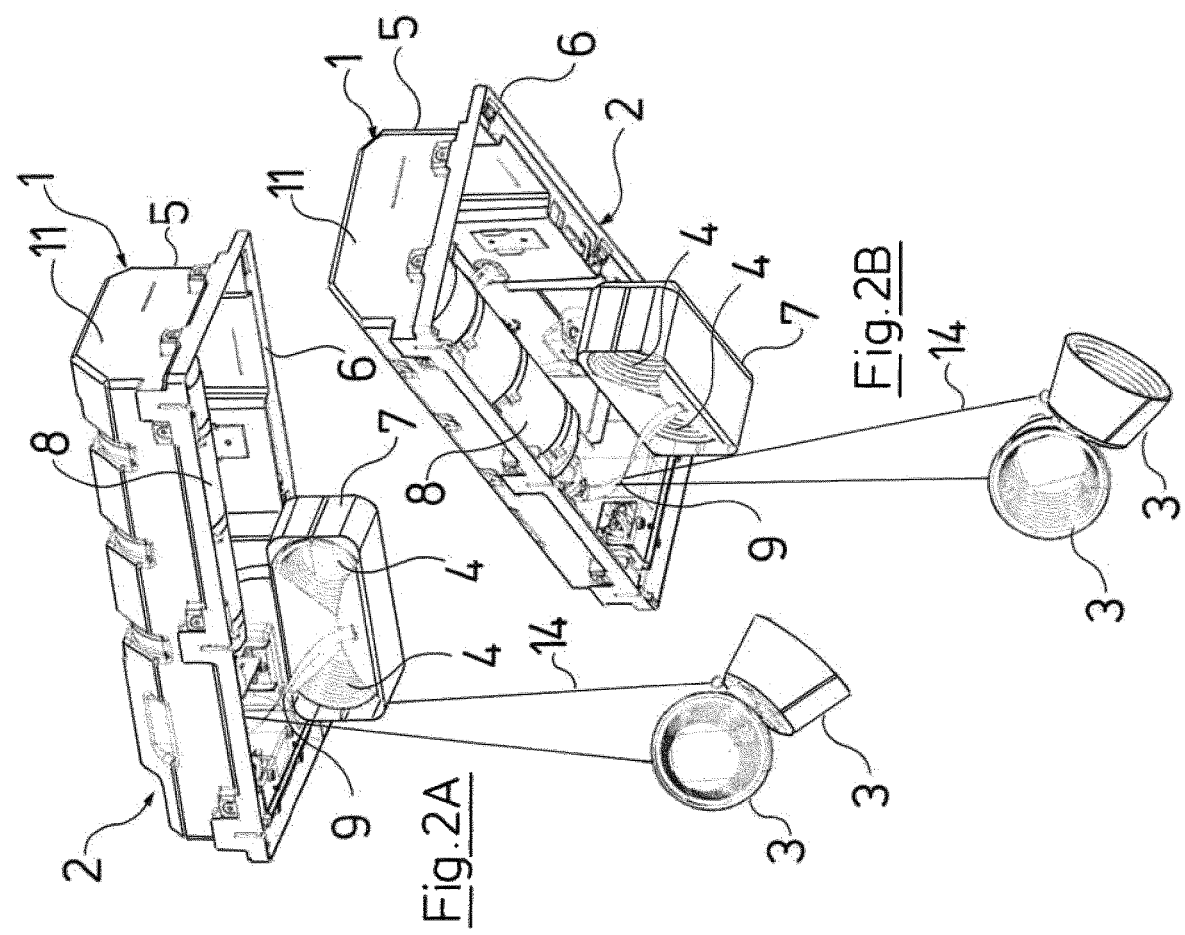
Fig.2A
Fig.2B

SYSTEM FOR THE EMERGENCY OXYGEN SUPPLY OF PASSENGERS IN AN AIRCRAFT

CROSS-REFERENCE TO RELATED APPLICATIONS

The present disclosure claims the benefit of and priority to German Application No. 102017205125.6, filed Mar. 27, 2017, the disclosure of which is incorporated herein by reference in its entirety.

TECHNICAL FIELD

The present disclosure relates to a system for the emergency oxygen supply of passengers in an aircraft, to a retaining receptacle for secondary oxygen masks of an oxygen supply system as well as to a packing and assembly unit for the assembly in a system for the emergency oxygen supply of passengers in an aircraft.

BACKGROUND

In aircraft, a sudden pressure drop can occur in the aircraft cabin. The sudden pressure drop in the aircraft cabin can lead to an acute lack of oxygen concerning the passengers. For this reason, passenger aircraft are equipped with emergency oxygen supply systems and oxygen masks which are mostly arranged in the cabin ceiling above the seats and in the case of such a pressure drop automatically drop from cabin ceiling or from suitable compartments which are provided for these in the cabin ceiling, by way of opening. Usually, the supply of oxygen to the oxygen mask is activated by way of pulling on the mask in the direction of the passenger, so that he can then be immediately supplied with oxygen. The oxygen mask containers in the cabin ceiling can comprise additional or secondary oxygen masks which can be used for example for travelling babies or the crew and which do not immediately fall out, but only after pulling on an already fallen mask. The primary object of this is to permit the masks to drop in an orderly manner and to prevent entanglement.

From DE 10 2013 220 478 A1 it is known to hold the secondary masks in the cabin ceiling in the respective oxygen mask containers with films, wherein the films press the secondary oxygen masks into the housing of the oxygen mask container and at one location are connected to the housing and at another location to the activation control of the oxygen source.

However, this arrangement entails a few risks which can compromise an intended application in the case of an emergency situation in the aircraft. For example, there is the risk of the secondary oxygen masks which are packed in such a manner getting stuck between the housing of the oxygen mask container and the film, instead of falling out when they are activated. Moreover, the film can be under tension due to high temperatures since it is fastened to the housing at two points, as mentioned above, and by way of this can be deformed such that it forms a cavity, in which the secondary oxygen mask after its activation or after the activation of the oxygen source is then fixedly held in an unintended manner. Moreover, it is disadvantageous that the film exerts quite a high pressure upon the secondary oxygen masks which are held therein, so that these adhere to one another—in the case that several are provided—or to the film.

It is further counted as belonging to the state of the art to arrange several oxygen masks such that these all drop simultaneously from the receptacle. This entails the danger of the masks which hang down next to one another becoming tangled and further entails the problem of the stowage of the masks in the receptacle after a trial release or a false alarm.

SUMMARY

It is the object of the present disclosure to avoid the problems which are outlined above, in particular to ensure the reliable provision of several oxygen masks which are arranged in the same receptacle.

According to the present disclosure, this object can be achieved by a system for the emergency oxygen supply of passengers in an aircraft, a retaining receptacle for secondary oxygen masks of a emergency oxygen supply system as well as a packing and assembly unit for assembly in a system for emergency oxygen supply of passengers in an aircraft as described herein. Advantageous embodiments of the invention are specified in the respective dependent claims, the subsequent description and the drawing.

According to an embodiment of the present disclosure, what is provided is accordingly a system for the emergency oxygen supply of passengers in an aircraft, with at least one primary oxygen mask and at least one secondary oxygen mask, which are arranged in a compartment above a seat in an aircraft and are each connected to an oxygen source by way of a tube, wherein the at least one primary oxygen mask is arranged in the compartment in a manner such that it falls out of the compartment before the at least one secondary oxygen mask, when the flap of the compartment opens. Herein, the system comprises at least one retaining receptacle which is arranged in the compartment and in which the at least one secondary oxygen mask is arranged, wherein the retaining receptacle is connected to the compartment by a first connecting means and to an activation device for the oxygen source by a second connecting means, said oxygen source being activatable by way of the at least one primary oxygen mask. The problems which are described above, as occur with systems which are known from the state of the art, are avoided by way of the system according to the invention. A reliable falling-out also of the secondary oxygen mask from the retaining receptacle is always ensured by the configuration according to the invention, wherein the primary oxygen masks each firstly drop from the compartment and then a dropping of the secondary oxygen masks from the protective retaining receptacle is triggered by the starting operating of the primary oxygen mask by a passenger. The secondary oxygen masks which are received in the retaining receptacle are protected by this and thus cannot become deformed or damaged in any other way and moreover when required, reliably drop from the retaining receptacle via the mechanism which is described above. The system according to the invention thus on the one hand ensures a reliable separation of the individual mask so that these, inherently of the system, drop downwards such that there is no danger of a tangling. This achieved by the two-staged ejection concept as well as by the retaining receptacle which separates the oxygen masks in the compartment, so that there is no danger of these adhering to one another. This also simplifies the bringing of the masks into the compartment within the aircraft, if for example these have been activated only for test purposes. Then for example the secondary oxygen masks can firstly be packed in their receiving receptacle, whereupon the primary oxygen masks are inserted into the compartment and this is then closed by the flap.

According to an embodiment of the present disclosure, at least one primary mask and at least one secondary mask are provided in a compartment, the secondary mask in a retaining receptacle. However, one can also provide two primary masks in the compartment and two secondary ones in the receptacle. If six masks are provided in the compartment, then it is advantageous to arrange two primary mask directly there and two secondary ones in a separate receptacle, wherein they are however commonly activated.

Herein, all masks can be connected onto a common oxygen supply, for example a suitable compressed gas bottle or also to different oxygen supplies. The latter is particularly to be preferred with the application of oxygen generators and it is then useful to assign the primary masks to a common generator which is activated by pulling on one of the masks and to assign the secondary masks to one or more oxygen generators which are not activated until the respective secondary masks are pulled by a passenger.

According to a preferred embodiment, the first connecting means comprises a first tape which is fastened at the compartment side to the fastening means, in particular to a clip or clamp.

According to a further preferred embodiment, the second connecting means comprises a second tape which is connected directly or indirectly to the activating device for the oxygen source.

The retaining receptacle is advantageously arranged within the compartment such that given a closed compartment, thus when the flap which terminates the compartment to the bottom is closed, it is arranged with the opening at the top, so that the oxygen mask or the oxygen masks which are located therein are received by the receptacle at all sides except at the upper side and are secured to the top against exit from the receptacle by a wall of the compartment. Then, by way of opening the flap, which is to say by way of pivoting open the flap then, the receptacle gets into a position, in which this opening is arranged laterally, thus typically pivoted by 90° to the previous upwardly directed arrangement. In this position, the masks are still reliably held within the receptacle, but can basically exit to the open side, at which the opening is located, but not without an external force action.

The at least one primary oxygen mask is preferably connected via a third connecting means, in particular a lanyard, to an activation pin of the activation device for activating the oxygen source.

Moreover, it is preferable for the second connecting means of the at least one secondary oxygen mask to likewise be connected to the activation pin.

According to yet a further preferred embodiment, the oxygen source comprises at least one first oxygen generator or a first oxygen bottle and at least one second oxygen generator or a second oxygen bottle, wherein the third connecting means of the at least one primary oxygen mask is connected to the activation device for the first oxygen generator or for the first oxygen bottle and the second connecting means of the at least one second oxygen mask is connected to an activation device for the second oxygen generator or for the second oxygen bottle.

The retaining receptacle can be formed as a pouch from a flexible material. As already mentioned, a deformation of the secondary oxygen masks or a sticking of the masks amongst one another is effectively avoided by way of this The retaining receptacle is preferably manufactured of a film which in particular consists of the same material as the at least one primary and the at least one secondary oxygen mask. This represents an inexpensive manufacturing variant.

Moreover, it is advantageous if two or more secondary oxygen masks can be received in the retaining receptacle.

According to an embodiment of the present disclosure, what is provided is moreover a retaining receptacle for secondary oxygen masks of an oxygen supply system.

Finally, according to an embodiment of the present disclosure, a packing and assembly unit for the assembly in a system for emergency oxygen supply of passengers in an aircraft is provided, wherein the packing and assembly unit comprises a retaining receptacle, in which at least one secondary oxygen mask is arranged.

BRIEF DESCRIPTION OF THE FIGURES

The present disclosure is hereinafter explained in more detail by way of an embodiment example which is represented in the drawing. There are shown in:

FIG. 1A illustrates, in a greatly simplified representation, the view of a ready equipped compartment for oxygen masks of a system for the emergency oxygen supply of passengers in an aircraft, from below with a removed cover, of a first embodiment of the present disclosure, FIG. 1B illustrates the compartment according to FIG. 1A in a perspective representation obliquely from below, FIG. 2A and FIG. 2B illustrate perspective views obliquely from below, with which the primary oxygen masks have dropped from the compartment and been activated and FIG. 3A and FIG. 3B illustrate, in an enlarged representation, respective detail views of fastening points of a retaining receptacle in the compartment.

DETAILED DESCRIPTION

FIG. 1A and FIG. 1B are respective views of a compartment 1 or oxygen mask container for oxygen masks of a system 2 for the emergency oxygen supply of passengers in an aircraft, according to an embodiment of the invention, wherein FIG. 1A is a view upon the system 2 from below and FIG. 1B a perspective view upon the system 2 obliquely from below. Such oxygen mask containers or compartments 1 are usually arranged above the seating rows in the cabin ceiling of passenger aircraft, so that the oxygen masks 3 which drop out of the compartment 1 in such an emergency can be gripped by the passengers and put over the mouth and nose and fastened for their oxygen supply.

The system 2 for the emergency oxygen supply of passengers, in the embodiment example which is represented here comprises two primary oxygen masks 3 and two further secondary oxygen masks 4 (see FIG. 2A, 2B). All oxygen masks, which is to say the primary oxygen masks 3 and secondary oxygen masks 4 are accommodated in the compartment 1, wherein the primary oxygen masks 3 are arranged directly in the housing 5 or on a side wall 6 of the housing 5, and the secondary oxygen masks 4 in a retaining receptacle 7 which in a deactivated condition of the system 2 is likewise received in the compartment 1.

Furthermore, all oxygen masks 3, 4 are connected to an oxygen source 8 which is likewise arranged in the compartment 1, via respective tubes which are not represented for reasons of a better overview. However, a separate oxygen source 8 could alternatively also be provided in the compartment for each of the primary and secondary oxygen masks 3, 4. A connection to a central emergency oxygen supply can also be provided here.

What is also to be recognised in FIG. 1A is that the retaining receptacle 7 is connected via a second connecting means 9 which here is designed as a fastening strap or band, to an activation device of the oxygen source 8 which can be activated by way of the primary oxygen masks 3 as is yet described further below. What can be recognised in FIG. 1B is a first connecting means 10 which here is likewise designed as a fastening strap or bard and connects the retaining receptacle 7 to the housing 5, here with the inner wall of the side wall 6, or fastens it therewith. Herein, the fastening strap (e.g. first connecting means 10) is designed in a Y-shaped manner, wherein two ends 12, 12' are fastened to an outer wall 11 of the retaining receptacle 7, and a further end 13, as already mentioned, to an inner side of the side wall 6 of the housing 5 of the compartment 1.

FIG. 2A and FIG. 2B are respective perpendicular views of the compartment 1 for oxygen masks 3, 4, said compartment having been shown in FIG. 1A and FIG. 1B, wherein the primary oxygen masks 3 which are arranged in the compartment 1 have already fallen out of the compartment 1 and wherein the retaining receptacle 7 with the secondary oxygen masks 4 is already located below the compartment 1. The primary oxygen masks 3 drop down out of the compartment 1 on account of gravity as soon the flap closing the compartment opens, as is common with systems of this type. In this position, the receptacle 7 already pivots out of the position which is represented in FIG. 1 and in which the receptacle 7 is open to the top, into a position which is aligned by 90° to this and in which the secondary masks 4 are ready for release.

An activation process of the system 2 for the emergency oxygen supply of passengers in an aircraft, according to the embodiment of the invention which is described in FIG. 1A to 2B is described hereinafter.

Before activation of the system 2, for example due to a pressure drop in the cabin of the aircraft, the system 2 is situated in a condition as is represented in FIG. 1A and FIG. 1B, with the primary and secondary oxygen masks 3, 4 arranged within the compartment 1. If however a pressure drop occurs in the cabin, which leads to the activation of the system 2, a flap of the compartment 1 which is not represented here opens and the primary oxygen masks 3 drop down out of the compartment 1. In the embodiment example which is represented here, this is two primary oxygen masks 3 which serve for the supply of two passengers of the aircraft who are seated in a seating row below the compartment 1. The retaining receptacle 7 also drops down from the compartment 1, without however the secondary oxygen masks 4 which are located therein from falling out of the retaining receptacle 7.

The primary oxygen masks 3 are each connected to the oxygen source 8 via an activation device (not shown), for example an activation pin, via a third connecting means 14 which is formed here as a lanyard. If one of the passengers pulls one of the two primary oxygen masks 3 which have dropped out of the compartment 1 towards himself, then the activation pin is pulled by way of the lanyard 14 which is connected to the primary oxygen mask 3, and the oxygen source 8 therefore activated or opened. This can be effected e.g. via a valve or by way of activating the oxygen source 8 or the oxygen generator. Hereby, typically a pin is pulled out. The second connecting means 9 which holds the retaining receptacle 7 close to the oxygen source 8 is simultaneously also fastened to this source by this pin. For this reason, the second connecting means 9 is released on activating the oxygen source 8 or the oxygen generator, so that the secondary oxygen masks 4 which are located in the retaining receptacle 7 can drop downwards out of the retaining receptacle 7.

As already mentioned above, several oxygen sources 8 or oxygen generators can be provided in the compartment 1. In this case, i.e. if e.g. two oxygen generators are provided, the first oxygen generator is activated by pulling on one of the primary oxygen masks 3 and the second oxygen generator by pulling on one of the secondary oxygen masks 4, which then, when the first connecting means 9 has released from the retaining receptacle 7, freely drop out of this.

FIG. 3A and FIG. 3B are respective detail views of fastening points 15, 16 of a retaining receptacle 7, corresponding to the embodiment example which is described in FIGS. 1A to 2B, in the compartment 1. As can be recognised in FIG. 3A, the fastening strap or the second connecting means 9 is arranged on the fastening point 15 close to the oxygen source 8 and is connected to the activation pin, so that the aforementioned procedure can take its course on pulling the lanyard 14, so that the secondary oxygen masks 4 drop out of the compartment 1. In contrast, a second fastening point 16 is recognisable in FIG. 3B, at which the first connecting means 10 is connected to the housing 5 at its end 13, for example by way of a clip 17 or a clamp or another fastening means 17.

LIST OF REFERENCE NUMERALS 1 compartment
2 systems for the emergency oxygen supply of passengers in an aircraft
3 primary oxygen mask
4 secondary oxygen mask
5 housing
6 side wall of the housing
7 retaining receptacle
8 oxygen source/oxygen generator
9 second connecting means
10 first connecting means
11 outer wall
12, 12' ends of the second connecting means 10
13 further end of the second connecting means 10
14 third connecting means/lanyard
15 fastening point close to the oxygen source
16 fastening point on the housing
17 fastening means/clip

What is claimed is:

1. A system for the emergency oxygen supply of passengers in an aircraft, comprising:
at least one primary oxygen mask and at least one secondary oxygen mask arranged in the aircraft in a compartment above a seat, the at least one primary oxygen mask and at least one secondary oxygen mask are each connected to an oxygen source by way of a tube, wherein the at least one primary oxygen mask is arranged in the compartment in a manner such that it drops out of the compartment before the at least one secondary oxygen mask when a flap of the compartment opens, wherein the at least one secondary oxygen mask does not drop out of the compartment until the second connector activates the oxygen source; and
at least one retaining receptacle arranged in the compartment, the at least one secondary oxygen mask arranged in the at least one retaining receptacle, wherein the retaining receptacle is connected to the compartment by a first connector and to an activation device of the oxygen source by a second connector, wherein the at least one primary oxygen mask is configured to activate the oxygen source.

2. The system of claim 1, wherein the first connector comprises a first band fastened at a compartment side of the first connector to a fastener.

3. The system of claim 2, wherein the fastener includes a clip or clamp.

4. The system of claim 1, the second connector comprises a second band which is directly or indirectly connected to the activation device for the oxygen source.

5. The system of claim 1, wherein the retaining receptacle comprises an upwardly facing opening.

6. The system of claim 1, wherein the at least one primary oxygen mask is connected via a third connector to an activation pin of the activation device for activating the oxygen source.

7. The system of claim 6, wherein the third connector is a lanyard.

8. The system of claim 6, wherein the second connector of the at least one secondary oxygen mask is connected to the activation pin.

9. The system of claim 6, wherein the oxygen source comprises at least one first oxygen generator or a first oxygen bottle and at least one second oxygen generator or a second oxygen bottle, wherein the third connector of the at least one primary oxygen mask is connected to the activation device for the first oxygen generator or for the first oxygen bottle and the second connector of the at least one secondary oxygen mask is connected to an activation device for the second oxygen generator or for the second oxygen bottle.

10. The system of claim 1, wherein the retaining receptacle is formed from a flexible pouch.

11. The system of claim 10, wherein the retaining receptacle is manufactured from a film.

12. The system of claim 11, wherein the retaining receptacle includes a same material as at least one of the at least one primary oxygen mask or the at least one secondary oxygen mask.

13. The system claim 1, wherein the retaining receptacle is configured to receive two or more secondary emergency oxygen masks.

14. A retaining receptacle for secondary oxygen masks configured to be used in the system of claim 1.

15. A packing and assembly unit for assembly in the system of claim 1, wherein the packing and assembly unit comprises a retaining receptacle, in which at least one secondary oxygen mask is arranged.

* * * * *